(12) United States Patent
    Kozloski et al.

(10) Patent No.: US 10,834,030 B2
(45) Date of Patent: Nov. 10, 2020

(54) VARIABLE UNDO-SEND DELAY TIME

(71) Applicant: International Business Machines Corporation, Armonk, NY (US)

(72) Inventors: James R. Kozloski, New Fairfield, CT (US); Michael S. Gordon, Yorktown Heights, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/360,345

(22) Filed: Mar. 21, 2019

(65) Prior Publication Data

US 2020/0304438 A1    Sep. 24, 2020

(51) Int. Cl.
    *H04L 12/58* (2006.01)
(52) U.S. Cl.
    CPC .............. *H04L 51/04* (2013.01); *H04L 51/08* (2013.01); *H04L 51/14* (2013.01)
(58) Field of Classification Search
    CPC ......... H04L 51/04; H04L 51/08; H04L 51/14; H04L 67/02; H04L 47/22; H04L 47/70; H04L 63/0227; H04L 63/1441; H04L 63/145; H04L 67/28; H04L 67/42; H04L 69/324; H04L 29/06; H04L 69/28; H04L 1/06; H04L 1/1812; G06F 13/22; G06F 21/554
    See application file for complete search history.

(56) References Cited

U.S. PATENT DOCUMENTS

| | | | |
|---|---|---|---|
| 6,654,787 B1 | 11/2003 | Aronson et al. | |
| 7,054,905 B1 | 5/2006 | Hanna et al. | |
| 7,512,400 B2* | 3/2009 | Starbuck | H04M 3/53333 455/414.1 |
| 8,782,751 B2* | 7/2014 | Chen | H04W 12/06 726/4 |
| 9,166,822 B2* | 10/2015 | Haynes | H04L 51/043 |
| 2004/0230642 A1 | 11/2004 | Collet et al. | |
| 2004/0340642 | 11/2004 | Collet et al. | |
| 2007/0073823 A1 | 3/2007 | Cohen et al. | |
| 2008/0046532 A1* | 2/2008 | Caspi | G06Q 10/107 709/207 |
| 2009/0313336 A1* | 12/2009 | Haynes | G06Q 10/107 709/206 |
| 2012/0204236 A1* | 8/2012 | Chen | H04L 63/08 726/4 |
| 2015/0195232 A1* | 7/2015 | Haugen | H04L 51/18 709/206 |

(Continued)

*Primary Examiner* — Ninos Donabed
(74) *Attorney, Agent, or Firm* — Cantor Colburn LLP; Joseph Petrokaitis (57) ABSTRACT

A computer-based communications system is provided. In aspects of the invention, the computer-based communications system is configured to adjust a time period for delaying a message from being sent by a user. A message is drafted by a user to be sent to a recipient. A selection is received for send the message to the recipient. A time period is adjusted for sending the message to the recipient based on user-centric considerations where the time period for delaying sending the message is not explicitly specified by the user. The message is delayed being sent for the time period. After the time period, the message is sent to the recipient.

17 Claims, 5 Drawing Sheets

(56) References Cited

U.S. PATENT DOCUMENTS

2017/0315694 A1* 11/2017 Alonso Ruiz ......... G06F 3/0488
2018/0113585 A1    4/2018 Shah
2020/0073893 A1*  3/2020 Talgorn ............... G06F 16/9035

* cited by examiner

VARIABLE UNDO-SEND DELAY TIME

BACKGROUND

The invention relates generally to computer-based communications systems, and relates more particularly to computer-based communications systems configure to retrieve sent messages before they are received.

Many of us send countless email messages every day. Sometimes, after the email message has already been sent, we realize a mistake has been made. Some systems provided a means for undoing the sent message. The sent message can be retrieved before it is received by the recipient if the sender acts quickly enough within a fixed period of time. Thus, it is possible to stop messages from actually being sent after hitting the send button if the request to retrieve the message is received within a certain period of time.

SUMMARY

According to a non-limiting embodiment, a computer-implemented method for adjusting a time period for delaying a message from being sent by a user is provided. The computer-implemented method includes drafting a message to a recipient and receiving a selection to send the message. The time period is adjusted to delay sending the message based on at least one user-centric consideration, wherein the time period is not explicitly specified by the user. Sending of the message is delayed for the adjusted time period.

According to another non-limiting embodiment, a system for delaying a message from being sent by a user is provided is provided. The system includes a processor coupled to a memory unit, wherein the processor is configured to execute program instructions. The program instructions include instructing the processor to display, through a display element, a message being drafted to a recipient and receiving a selection to send the message. The program instructions also instruct the processor to adjust the time period to delay sending the message based on at least one user-centric consideration, wherein the time period is not explicitly specified by the user. The program instructions also instruct the processor to delay sending the message for the adjusted time period then send the message to the recipient after the time period.

According to yet another non-limiting embodiment, a computer program product is provided. The computer program product includes a computer readable storage medium having program instructions embodied therewith, the program instructions executable by a computer processor to cause the computer processor to perform a method for delaying a message from being sent by a user is provided. A message being drafted to a recipient is displayed and a selection to send the message is received. The time period to delay sending the message is adjusted based on at least one user-centric consideration, wherein the time period is not explicitly specified by the user. Sending the message is delayed for the adjusted time period then the message is sent to the recipient after the time period.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Sometime it is desirable to recall a message after the send button has been selected. A user can sometimes successfully recall a message if action is taken quick enough. In such case, the time period for recalling a message is fixed. What is needed is the ability to automatically adjust the time period to undo a sent message based on real-time user-centric considerations where the user does not explicitly specify the time period. For example, a complex message with multiple intended recipients could result in an increased period of time to delay sending the message so that the user/drafter has more time to recall the message if needed. In contrast, a simple message to a single recipient has reduced risk and, therefore, only a short time period of delay to recall the message is needed. Thus, user-centric considerations automatically determine the time period for delaying a message after the user has indicated to send the message.

FIGS. 1-3A and 3B and the associated descriptions provide a description of various operating environments in which examples of the disclosure are practiced. However, FIGS. 1-3A and 3B are for purposes of example and illustration and are not limiting of the vast number of computing device configurations that are utilized for practicing aspects of the disclosure.

Figure 1:
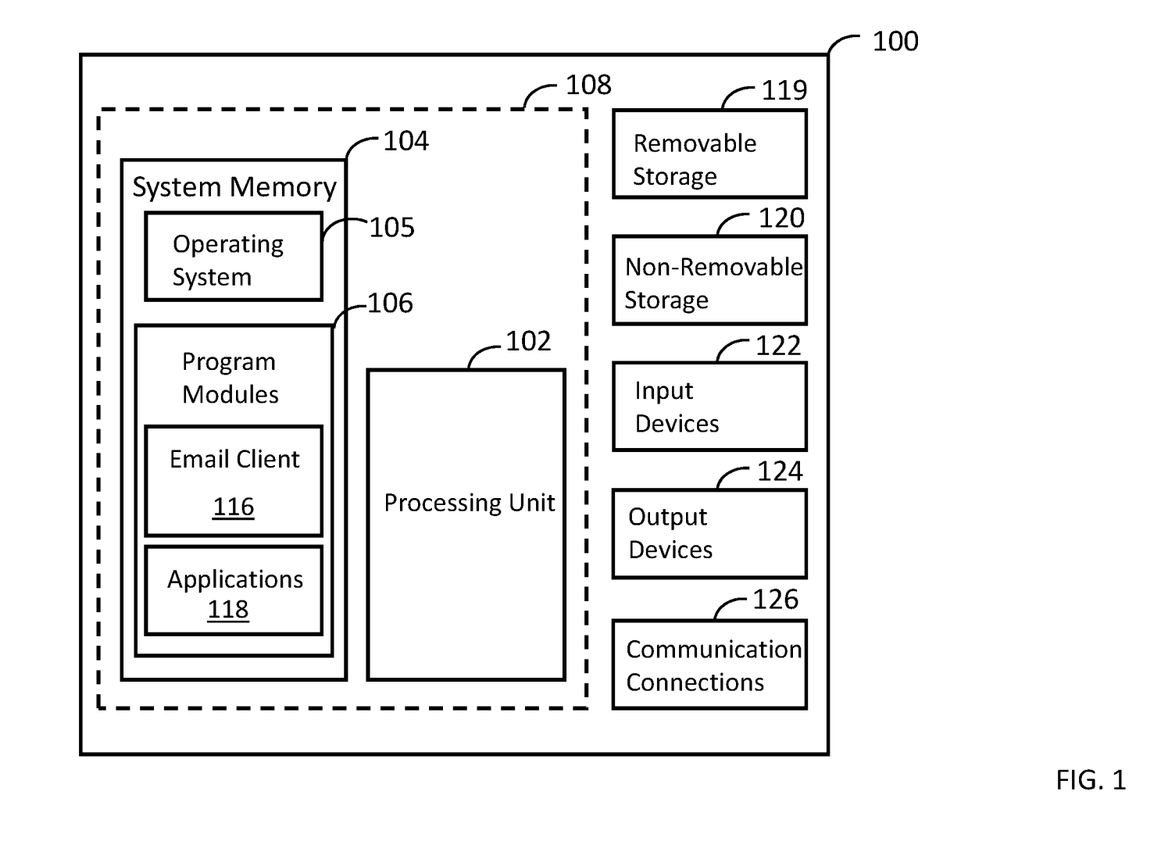
FIG. 1 depicts a block diagram illustrating an exemplary computer processing system that may be utilized to implement one or more embodiments of the present invention.

Referring to FIG. 1, there is shown an embodiment illustrating physical components (i.e., hardware) of a processing system, commonly referred to as a computing device or system 100, for example, a mobile telephone, a smartphone, a tablet personal computer, a laptop computer, and the like, for implementing the teachings herein. In a basic configuration, the computing device 100 includes at least one processing unit 102 and a system memory 104. According to an aspect, depending on the configuration and type of computing device, the system memory 104 comprises, but is not limited to, volatile storage (e.g., random access memory), non-volatile storage (e.g., read-only memory), flash memory, or any combination of such memories.

According to an aspect, the system memory 104 includes an operating system 105 and one or more program modules 106 suitable for running software applications 118. According to an aspect, the system memory 104 includes email client 116 for message management, composition, transmission and reception. The email client 116 may sometimes be referred to as a mail user agent (MUA). The operating system 105, for example, is suitable for controlling the operation of the computing device 100.

Furthermore, aspects are practiced in conjunction with a graphics library, other operating systems, or any other application program, and is not limited to any particular application or system. This basic configuration is illustrated in FIG. 1 by those components within a dashed line 108. According to an aspect, the computing device 100 has additional features or functionality. For example, according to an aspect, the computing device 100 includes additional data storage devices (removable and/or non-removable) such as, for example, magnetic disks, optical disks, or tape. Such additional storage is illustrated in FIG. 1 by a removable storage device 119 and a non-removable storage device 120.

As stated above, according to an aspect, a number of program modules and data files are stored in the system memory 104. While executing on the processing unit 102, the program modules 106 (e.g., email client 116) perform processes including, but not limited to, one or more of the stages of the method 400 illustrated in FIG. 4. According to an aspect, other program modules are used in accordance with examples and include applications such as contacts applications, word processing applications, spreadsheet applications, database applications, slide presentation applications, drawing or computer-aided application programs, and the like.

According to an aspect, the computing device 100 has one or more input device(s) 122 such as a keyboard, a mouse, a pen, a sound input device, a touch input device, etc. The output device(s) 124 such as a display, speakers, a printer, etc. are also included according to an aspect. The aforementioned devices are examples and others may be used. According to an aspect, the computing device 100 includes one or more communication connections 126 allowing communications with other computing devices. Examples of suitable communication connections 126 include, but are not limited to, radio frequency (RF) transmitter, receiver, and/or transceiver circuitry, universal serial bus (USB), parallel, and/or serial ports.

Figure 2:
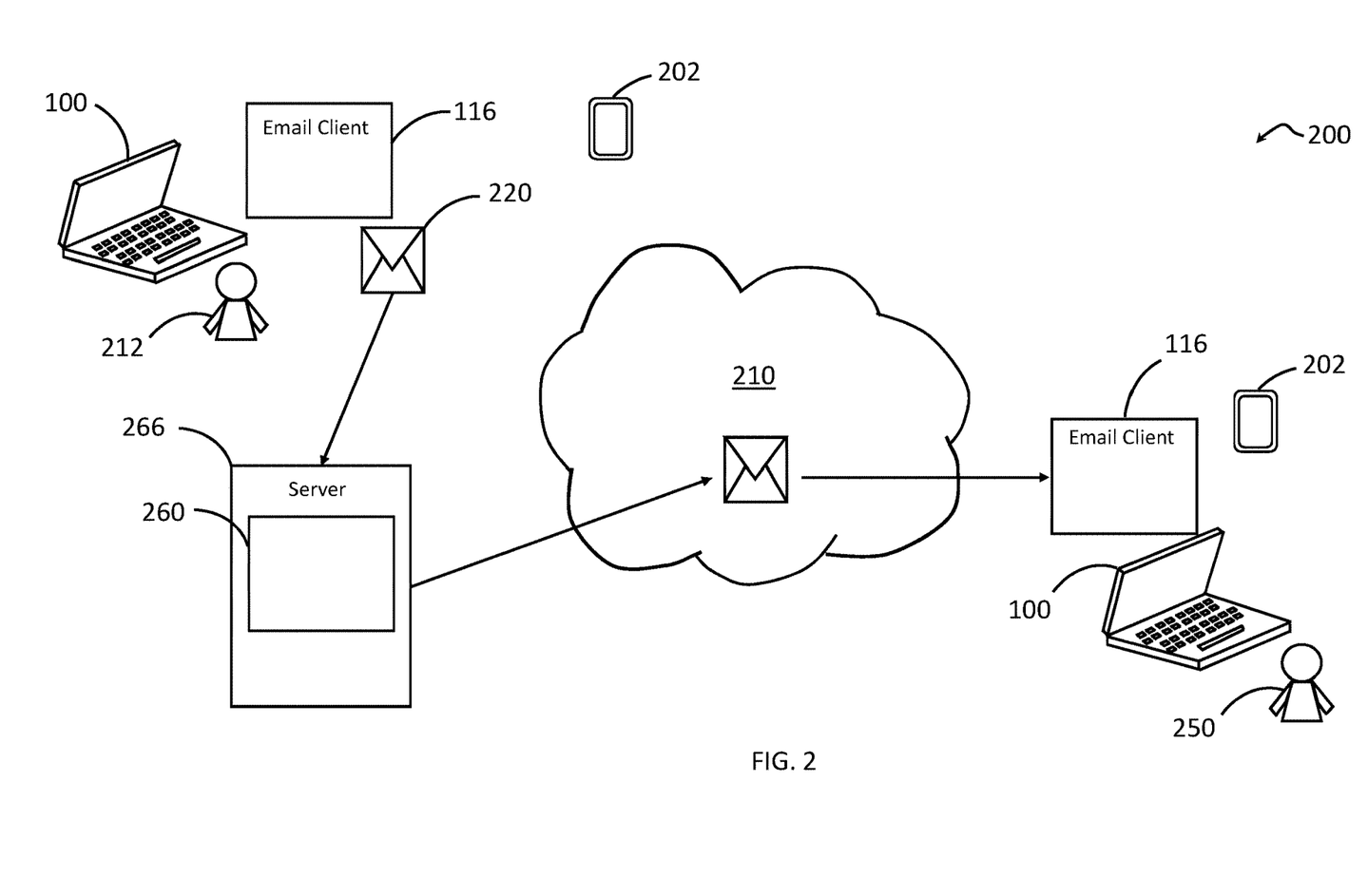
FIG. 2 depicts an electronic messaging environment where messages are drafted and transmitted over a network and that is utilized to implement one or more embodiments of the present invention.

FIG. 2 illustrates an exemplary embodiment of an electronic messaging environment 200 where messages are drafted and transmitted over a network 210 such as the Internet and/or a corporate network, for example, an enterprise network. The message may be, for example, an email message a text message, a social media post, or a post to a bulletin board. For example, a user 212 uses the email client 116 on the computing device 100 to compose or draft messages such as message 220. After the user hits the send button to transmit the message 220 to one or more intended recipients 250, the message 220 is received at a mail transfer agent (MTA) 260 of a mail server 266. The incoming message 220 is then delivered over the network 210 to the email client 116 of one or more intended recipients 250. However, after receiving the selection to send the message and while delaying sending of the message, the message may be recalled during a time period.

In one or more embodiments, while the messages are being composed and sent, the email client 116 generates a profile based on email analytics such as, for example, the length of time taken to draft each message, the complexity of each drafted message, the content of the message including tone and semantics, the recipients of the messages, the number of attachments or images, the level of sensitivity or confidentiality of the contents of the body of the message and attachments, the number of windows open while drafting the message, the level of multitasking by the user, whether the user is involved in other activities such as speaking on the phone, the time of day, the number of detected typos, and the number of times the user previously tried and succeeded in retrieving or recalling messages after making selections to send the messages. Thus, the profile provides user-centric considerations which are then subsequently used to automatically determine a period of time to delay sending a newly drafted message after the user has indicated to send the message. For example, the more complex the message is the greater the delay could be. Also, as the number of recipients increases the length of the delay could increase. Increase sensitivity of the message body or the attachment could also increase the delay for sending the message. Also, an increased level of multitasking could result in a longer delay. A simple message without attachments to only a single recipient could have a short delay.

As mentioned above, a message that a user has indicated to send may be delayed for a period of time in the event the user may want to recall the message for any reason. The time period for delaying each message 220 being sent to the mail server 266 is automatically determined based on one or more of the user-centric considerations. In other words, each time a message is drafted and a send button is selected, a time period is automatically adjusted or determined for delaying the message. Also, in one or more embodiments, the particular adjustment of the time period for delaying sending a message is unbeknownst to the user while the message is being drafted. Thus, the user or message drafter does not explicitly specify the time period for delaying a message.

The time period for delaying a message may be adjusted based on the user's/drafter's profile and/or characteristics of the message itself. For example, in one or more embodiments, the time period to delay sending the message is adjusted based on the number of times the user had previously requested messages to be retrieved after having made selections to send messages. The time period to delay sending the messages may also be adjusted based on one or more of the following: a distraction level of the user while drafting the message being delayed, based on the complexity of the message being delayed, its tone or semantic content as determined by text analytics, an intended recipient of the message (such as the drafter's boss, or some other important or significant person), the number of recipients, whether there is an attachment or the sensitivity level of the attachment or the content of the body of the message, or the level of the user's multitasking such as, for example, watching video, searching on the internet, on the computing device 100 or on other devices 202 communicatively coupled to the computing device 100, where the message was drafted, for example.

Figure 3A:
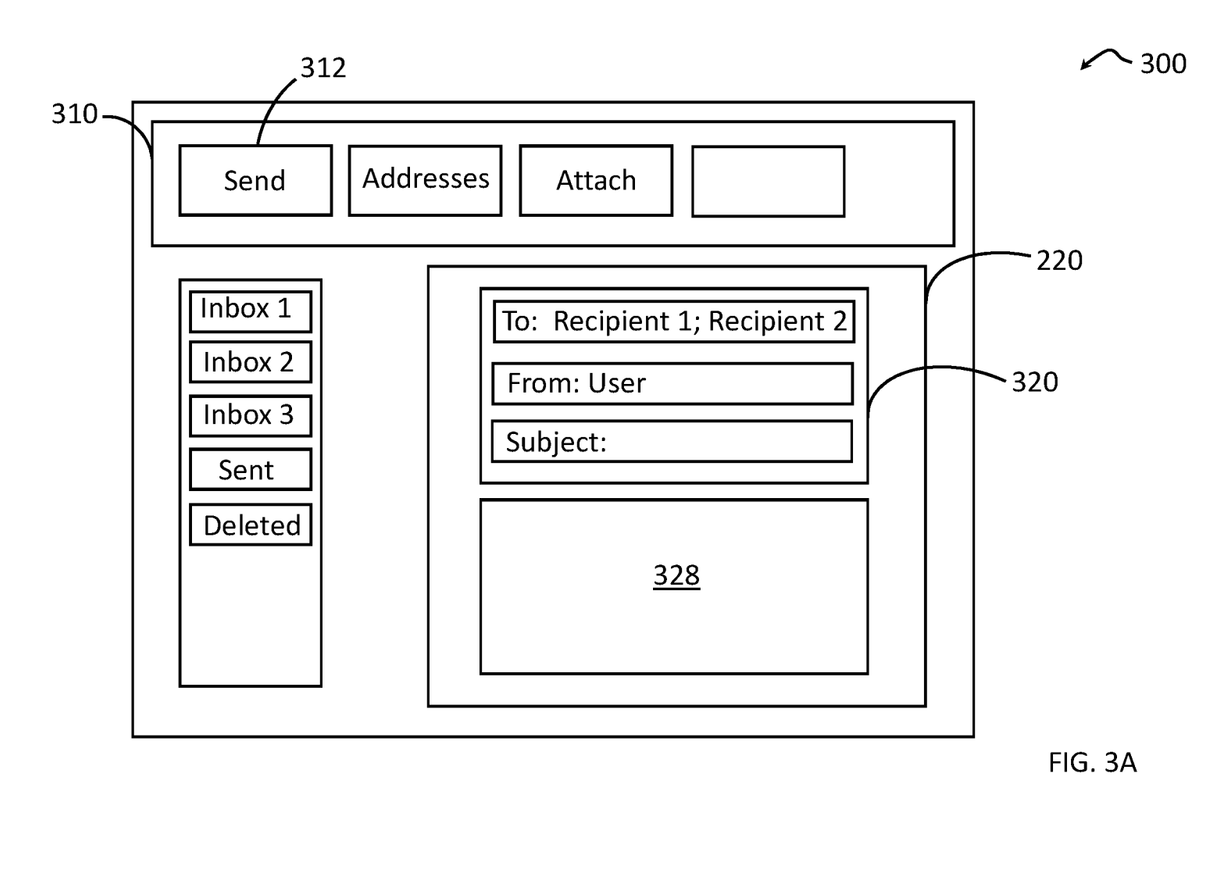
FIG. 3A depicts a user interface of an email client where a message is being drafted according to one or more embodiments of the present invention.
Figure 3B:
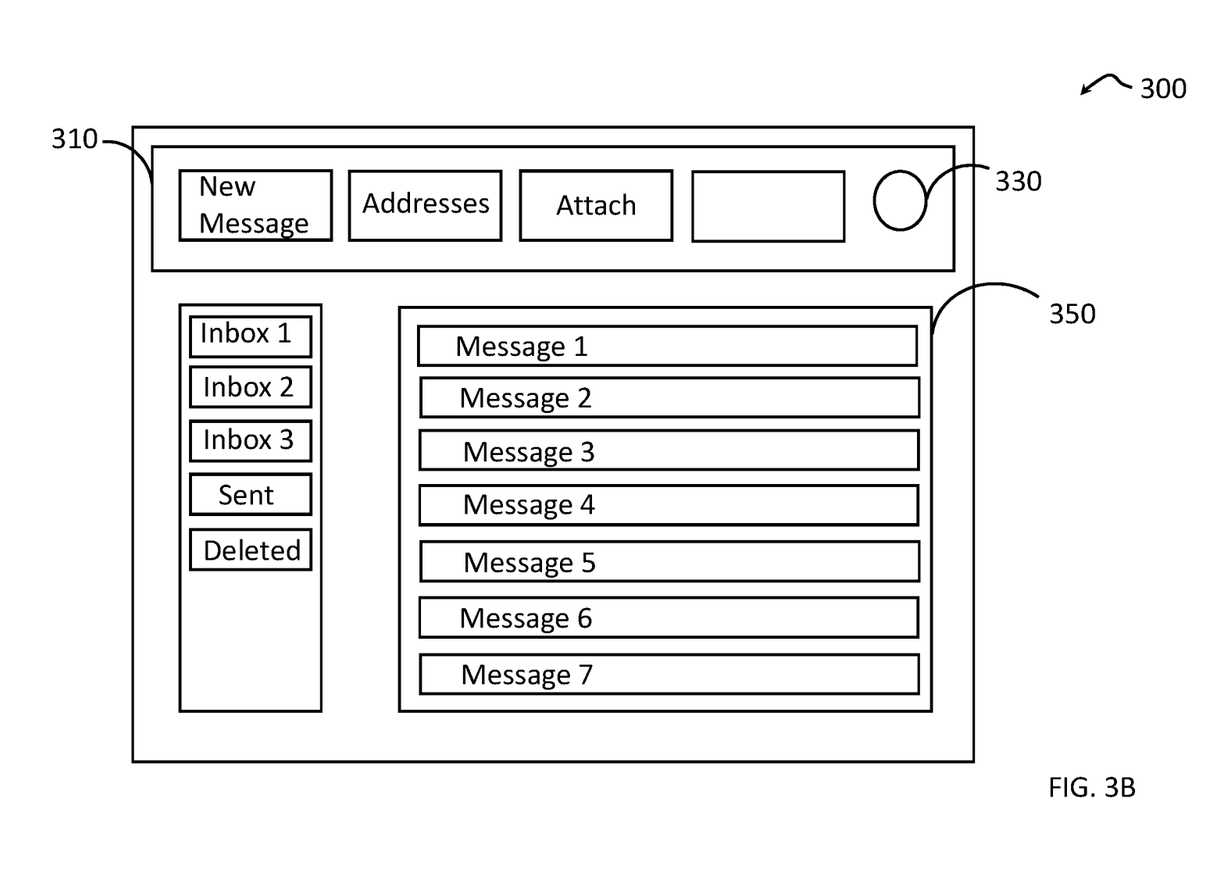
FIG. 3B depicts the user interface of FIG. 3A indicating the message is being delayed for a period of time after the send button has been selected according to one or more embodiments of the present invention.

FIG. 3A depicts a user interface 300 of the email client 116 for the user 212 where the message 220 is being drafted. In one or more embodiments, the user interface 300 has a tool bar 310 with one or more buttons such as send button 312. Also, the user interface 300 includes the message 220 having a message header 320 and a message body 328. Referring now to FIG. 3B, after the user 212 selects the send button 312 (FIG. 3A), the message 220 is no longer visible and is replaced with a list of sent or received messages 350 such as the received messages in Inbox 1, for example. An indicator 330 is displayed in the tool bar 310 or elsewhere in the user interface 300 for indicating the sending of the message 220 is delayed. The adjustment of the time period for delaying the message 220 can be determined while the message 220 is being drafted or upon selection of the send button 312 by the user 212. The indicator 330 can continue to be displayed for the time adjusted period of the delay so that the user is continuously reminded, for the time period, that the message 220 has not actually been sent yet despite the user 212 having selected the send button 312.

In one embodiment, the message 220 continues to be displayed for the period of time the indicator 330 is being delayed and then the message 220 disappears, along with the indicator 330, after the time period for the delay has expired. In one or more embodiments, the shape, size and/or color of the indicator 330 changes as time is expiring. The indicator 330 may also include flashes of light. In one or more embodiments, the color of the indicator 330 changes as time counts down, for example, the indicator 330 could be green when more than 10 seconds remain, red when less than 10 seconds remain, flash red when less than 5 seconds remain before the message is sent.

Also, in one or more embodiments, the indicator 330 itself may be selectable. For example, selecting the indicator 330 can result in recalling or retrieving a message during the time period of the delay. In one or more embodiments, the indicator 330 may be a timer indicating how much of the delay is left before the message is sent.

Figure 4:
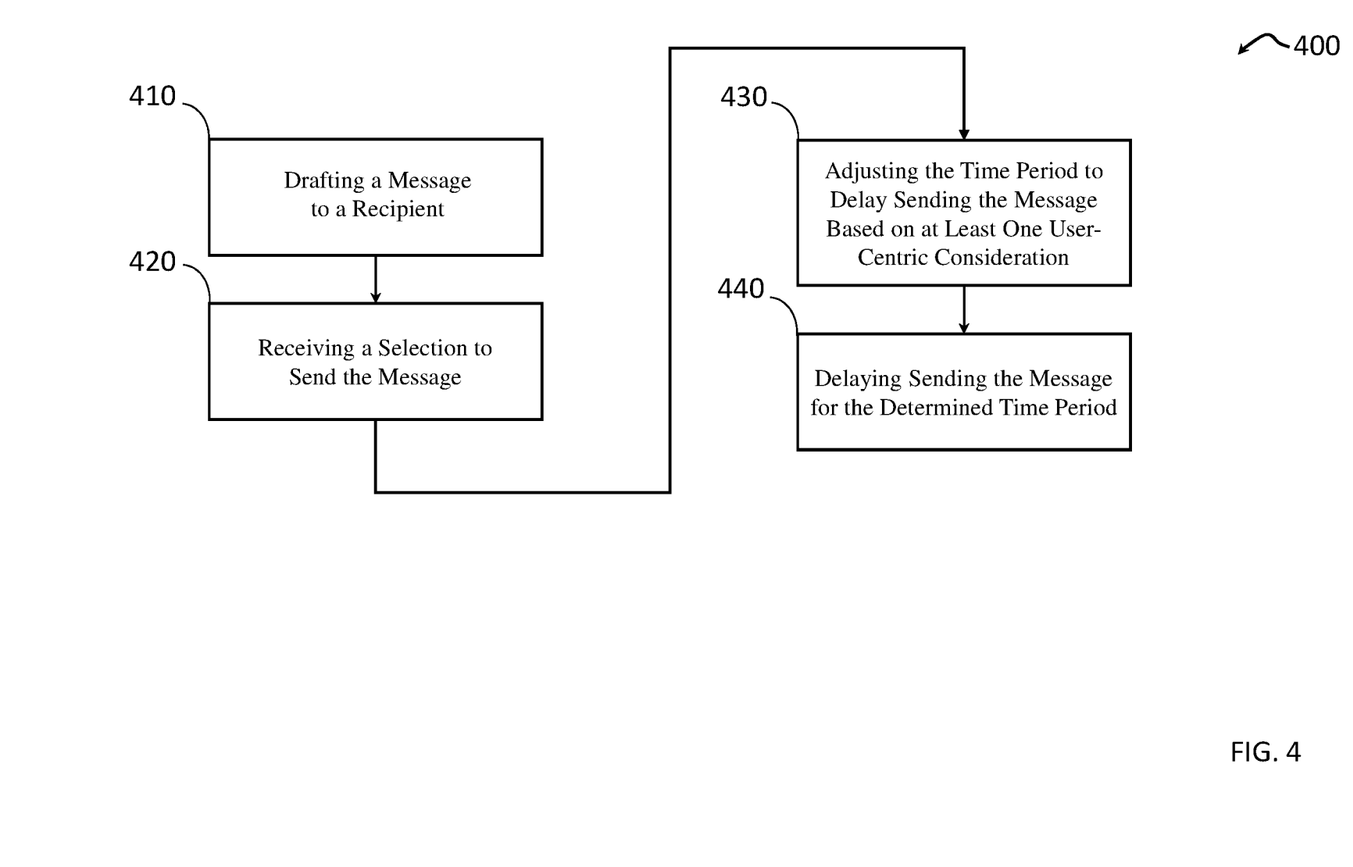
FIG. 4 is a flow diagram illustrating a method for adjusting a time period for delaying a message from being sent by a user according to one or more embodiments of the present invention.

Turning to FIG. 4, one or more embodiments may include a method 400 for adjusting a time period for delaying a message from being sent by a user. The flow diagram of FIG. 4 illustrates the method 400 that includes process block 410 for drafting a message to a recipient and process block 420 for receiving a selection to send the message. The method 400 also includes process block 430 for adjusting the time period to delay sending the message based on at least one user-centric consideration, wherein the time period is not explicitly specified by the user. The method 400 also includes process block 440 delaying sending the message for the determined time period.

The method 400 may also include, while the message is being drafted or after the user has made a selection to send the message, adjusting the time of the delay to a period of time that is unbeknownst to the user. The method 400 may also include displaying an indicator of the adjusted period of time after receiving the selection to send the message. The method 400 may also include sending the message to the recipient after the expiration of the time period.

Various technical benefits are achieved using the system and methods described herein, including the capability of providing enhanced performance for applications with exclusive access to the co-processors while also allowing applications that do not need performance access to accelerators when shared access is available. In this manner, the computing device can realize performance gains through the use of co-processors in the system, thereby improving overall processing speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for adjusting a time period for delaying a message from being sent by a user, the computer-implemented method comprising:

drafting, using a processor, a message to a recipient;

receiving, using the processor, a selection to send the message;

adjusting, using the processor, the time period to delay sending the message based on a number of application windows that are concurrently open at the time of the drafting of the message, wherein the time period is not explicitly specified by the user;

delaying sending the message for the adjusted time period; and displaying an indicator after receiving a selection to send the message, wherein the indicator indicates a time remaining for the user to recall the message.

2. The computer-implemented method of claim 1, wherein adjusting the time period to delay sending the message comprises adjusting the time period to delay sending the message further based on a distraction level of the user.

3. The computer-implemented method of claim 1, wherein adjusting the time period to delay sending the message comprises adjusting the time period to delay sending the message further based on a complexity of the message.

4. The computer-implemented method of claim 1, wherein adjusting the time period to delay sending the message comprises adjusting the time period to delay sending the message further based on an intended recipient of the message.

5. The computer-implemented method of claim 1, wherein adjusting the time period to delay sending the message comprises adjusting the time period to delay sending the message further based on the message having an attachment.

6. The computer-implemented method of claim 1, wherein adjusting the time period to delay sending the message comprises adjusting the time period to delay sending the message further based on at least one of the following:
   a level of the user's multitasking; and
   a level of confidentiality of the message.

7. The computer-implemented method of claim 1 further comprising, after receiving the selection to send the message and while delaying sending of the message, recalling the message during the time period.

8. A system for adjusting a time period for delaying a message from being sent by a user, the system comprising:
   a processor coupled to a memory unit, wherein the processor is configured to execute program instructions comprising:
     controlling a display to display a message being drafted to a recipient;
     receiving a selection to send the message;
     adjusting the time period to delay sending the message based on a number of application windows that are concurrently open at the time of the drafting of the message, wherein the time period is not explicitly specified by the user;
     delaying sending the message for the adjusted time period;
     displaying an indicator after receiving a selection to send the message, wherein the indicator indicates a time remaining for the user to recall the message; and
     sending the message to the recipient after expiration of the time period.

9. The system of claim 8, wherein adjusting the time period to delay sending the message comprises adjusting the time period to delay sending the message further based on a distraction level of the user.

10. The system of claim 8, wherein adjusting the time period to delay sending the message comprises adjusting the time period to delay sending the message further based on complexity of the message.

11. The system of claim 8, wherein adjusting the time period to delay sending the message comprises adjusting the time period to delay sending the message further based on at least one of the following:
    an intended recipient of the message;
    the message having an attachment;
    a level of confidentiality of the message; and
    a level of the user's multitasking.

12. The system of claim 8, wherein adjusting the time period to delay sending the message comprises adjusting the time period to delay sending the message while the message is being drafted unbeknownst to the user.

13. A computer program product comprising a computer readable storage medium having program instructions embodied therewith, the program instructions executable by a computer processor to cause the computer processor to perform a method for adjusting a time period for delaying a message from being sent by a user, the method comprising:
    controlling a display to display a message being drafted to a recipient;
    receiving a selection to send the message;
    adjusting the time period to delay sending the message based on a number of application windows that are concurrently open at the time of the drafting of the message, wherein the time period is not explicitly specified by the user;
    delaying sending the message for the adjusted time period;
    displaying an indicator after receiving a selection to send the message, wherein the indicator indicates a time remaining for the user to recall the message; and
    sending the message to the recipient after expiration of the time period.

14. The computer program product of claim 13, wherein adjusting the time period to delay sending the message comprises adjusting the time period to delay sending the message further based on at least one of the following:
    a number of times the user has requested messages to be retrieved after making selections to send the messages;
    a distraction level of the user;
    a level of confidentiality of the message; and
    on complexity of the message.

15. The computer program product of claim 13 further comprising displaying an indicator that indicates the adjusted period of time to recall the message after receiving the selection to send the message.

16. The computer program product of claim 13, wherein adjusting the time period to delay sending the message comprises adjusting the time period to delay sending the message further based on at least one of the following:
    an intended recipient of the message;
    a level of confidentiality of the message;
    the message having an attachment; and
    a level of the user's multitasking.

17. The computer program product of claim 13, wherein adjusting the time period to delay sending the message comprises adjusting the time period to delay sending the message while the message is being drafted unbeknownst to the user.

\* \* \* \* \*